(12) United States Patent
Kosaki et al.

(10) Patent No.: US 9,669,703 B2
(45) Date of Patent: Jun. 6, 2017

(54) VEHICLE

(75) Inventors: Akihiro Kosaki, Aichi-gun (JP);
Yasutoshi Mizuno, Toyokawa (JP);
Toshiyuki Hara, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 13/817,801

(22) PCT Filed: Aug. 31, 2010

(86) PCT No.: PCT/JP2010/005349
§ 371 (c)(1),
(2), (4) Date: Feb. 19, 2013

(87) PCT Pub. No.: WO2012/029088
PCT Pub. Date: Mar. 8, 2012

(65) Prior Publication Data
US 2013/0153312 A1    Jun. 20, 2013

(51) Int. Cl.
| | |
|---|---|
| *B60K 11/00* | (2006.01) |
| *B60L 11/18* | (2006.01) |
| *B60K 1/04* | (2006.01) |
| *B60L 7/14* | (2006.01) |
| *B60K 11/06* | (2006.01) |
| *B60K 1/00* | (2006.01) |

(52) U.S. Cl.
CPC ............... *B60K 11/00* (2013.01); *B60K 1/04* (2013.01); *B60L 7/14* (2013.01); *B60L 11/1803* (2013.01); *B60L 11/1874* (2013.01); *B60L 11/1877* (2013.01); *B60K 11/06* (2013.01); *B60K 2001/005* (2013.01); *B60K 2001/0438* (2013.01); *B60L 2210/12* (2013.01); *B60L 2210/14* (2013.01); *B60L 2240/34* (2013.01); *B60L 2240/545* (2013.01); *B60L 2240/662* (2013.01); *B60L 2270/44* (2013.01); *Y02T 10/7005* (2013.01); *Y02T 10/705* (2013.01); *Y02T 10/7225* (2013.01); *Y02T 10/7233* (2013.01); *Y02T 10/7291* (2013.01); *Y02T 90/16* (2013.01)

(58) Field of Classification Search
USPC ............. 180/65.1, 68.1, 68.2, 68.5; 429/148
See application file for complete search history.

(56) References Cited

U.S. PATENT DOCUMENTS

| | | | | |
|---|---|---|---|---|
| 3,987,862 | A * | 10/1976 | Lidstone ............... | B60K 13/02 180/68.1 |
| 4,653,788 | A * | 3/1987 | Di Giusto ..................... | 293/117 |
| 4,689,060 | A * | 8/1987 | Koske .................. | F02M 35/164 180/68.1 |
| 4,697,665 | A * | 10/1987 | Eastman et al. .............. | 180/230 |
| 5,392,873 | A * | 2/1995 | Masuyama et al. ......... | 180/68.5 |

(Continued)

FOREIGN PATENT DOCUMENTS

| JP | 05-087001 A | 4/1993 |
|---|---|---|
| JP | 05-193375 A | 8/1993 |

(Continued)

*Primary Examiner* — Frank Vanaman
(74) *Attorney, Agent, or Firm* — Andrews Kurth Kenyon LLP

(57) ABSTRACT

A vehicle includes a battery, a duct through which air for cooling the battery flows, and a bumper, wherein an opening portion at an end of the duct faces an outer face of the duct inside the bumper.

7 Claims, 4 Drawing Sheets

(56) References Cited

U.S. PATENT DOCUMENTS

| | | | |
|---|---|---|---|
| 5,490,572 A * | 2/1996 | Tajiri et al. | 180/65.1 |
| 5,860,685 A * | 1/1999 | Horney et al. | 293/113 |
| 6,308,799 B1 * | 10/2001 | Konstantakopoulos | 181/282 |
| 7,562,739 B2 * | 7/2009 | Lan et al. | 180/339 |
| 2003/0066696 A1 * | 4/2003 | Nakamura | F16H 57/0489 180/68.1 |
| 2003/0168267 A1 * | 9/2003 | Borroni-Bird et al. | 180/68.1 |

FOREIGN PATENT DOCUMENTS

| | | |
|---|---|---|
| JP | 07-132859 A | 5/1995 |
| JP | 08-244473 A | 9/1996 |
| JP | 2009-040189 A | 2/2009 |
| JP | 2009-083656 A | 4/2009 |
| JP | 2009-087773 A | 4/2009 |

* cited by examiner

VEHICLE

CROSS-REFERENCE TO RELATED APPLICATIONS

This application is a United States National Stage Patent Application filed under 35 U.S.C. §371, based on International Application Serial No. PCT/JP2010/005349, which was filed on Aug. 31, 2010, the entire contents of which is expressly incorporated herein by reference.

TECHNICAL FIELD

The present invention relates to a vehicle having the function of controlling the temperature of equipment mounted on the vehicle by using a heat exchange medium flowing through a duct.

BACKGROUND ART

Vehicles having a temperature adjusting structure mounted thereon for adjusting the temperature of equipment mounted on the vehicle are known. Patent Document 1 has disclosed a vehicle of this type including a cooling fan which supplies air for cooling to a motor. An air inlet/outlet port of the fan faces the back side of a rear bumper forming part of a car body.

PRIOR ART DOCUMENTS

Patent Documents

[Patent Document 1] Japanese Patent Laid-Open No. Hei 05 (1993)-193375
[Patent Document 2] Japanese Patent Laid-Open No. Hei 08 (1996)-244473
[Patent Document 3] Japanese Patent Laid-Open No. Hei 07 (1995)-132859

DISCLOSURE OF THE INVENTION

Problems to be Solved by the Invention

In the configuration described in Patent Document 1, however, the activation of the fan to take in air may cause the sucking action of the rotating fan to draw water or the like attached to an inner wall of the rear bumper into the air inlet/outlet port.

To address this, it is an object of the present invention to prevent flow of water or the like into equipment mounted on a vehicle through a duct in which a heat exchange medium flows for exchanging heat with the equipment mounted on the vehicle.

Means for Solving the Problems

To solve the abovementioned problem, the present invention provides, according to an aspect, a vehicle:

(1) in which a motor for running the vehicle is driven by a power stored in a battery, including equipment mounted on the vehicle, and a duct through which a heat exchange medium exchanging heat with the equipment mounted on the vehicle flows, wherein an opening portion at an end of the duct faces an outer face of the duct; and (2) in the configuration described in (1), further including a bumper of the vehicle, wherein the opening portion at the end of the duct faces the outer face of the duct inside the bumper.

(3) In the configuration described in (2), the opening portion faces the outer face of the duct in a width direction of the vehicle. Since the space formed within the bumper extends in the width direction, the opening portion having an opening direction set in the width direction can increase the interval between the opening portion and an inner face of the bumper located in opposite to the opening portion. Thus, the water attached to the inside of the bumper is not easily directed toward the opening portion.

(4) In the configuration described in (2) or (3), preferably, the bumper has a guiding opening portion in a bottom face for guiding the duct into the bumper, and a spacing is formed between the guiding opening portion and the duct. According to the configuration in (4), any assembly error in inserting the duct into the bumper can be accommodated.

(5) In the configuration described from (2) to (4), the duct is an exhaust duct for exhausting the heat exchange medium after the heat exchange with the equipment mounted on the vehicle, and the bumper can be located at a back end portion of the vehicle. According to the configuration in (5), the space provided within the rear bumper of the vehicle can be effectively utilized.

(6) In the configuration described in (5), the duct can include a duct end portion having the opening portion, and the duct end portion can include a hook-shaped portion. The hook-shaped portion can drop the water flowing into the duct through the opening portion by gravitation to discharge the water outside the duct.

(7) In the configuration described in (6), the duct end portion can include a first bend portion and a second bend portion located downstream of the first bend portion in an exhaust direction, the first bend portion can be bent in a direction away from the opening portion in the opening direction of the opening portion, and the second bend portion can be bent in a direction opposite to the bend direction of the first bend portion. The first bend portion can reduce a pressure loss during the exhaust.

(8) In the configuration described from (1) to (7), the opening portion can be provided at a level higher than an allowing position of the vehicle to which submergence in water is allowed. If part of the vehicle is submerged in water, the flow of the water into the duct through the opening portion can be prevented.

(9) In the configuration described from (1) to (8), the equipment mounted on the vehicle may be a battery. The flow of water into the battery can be avoided.

(10) In the configuration described in (9), the battery can be located on a lower face of a floor panel of the vehicle. Even when the battery is placed outside the interior of the car, the flow of water into the battery can be prevented.

Advantage of the Invention

According to the present invention, the flow of water or the like into the equipment mounted on the vehicle through the duct in which the heat exchange medium flows for exchanging heat with the equipment mounted on the vehicle can be prevented.

BEST MODE FOR CARRYING OUT THE INVENTION

Figure 1:
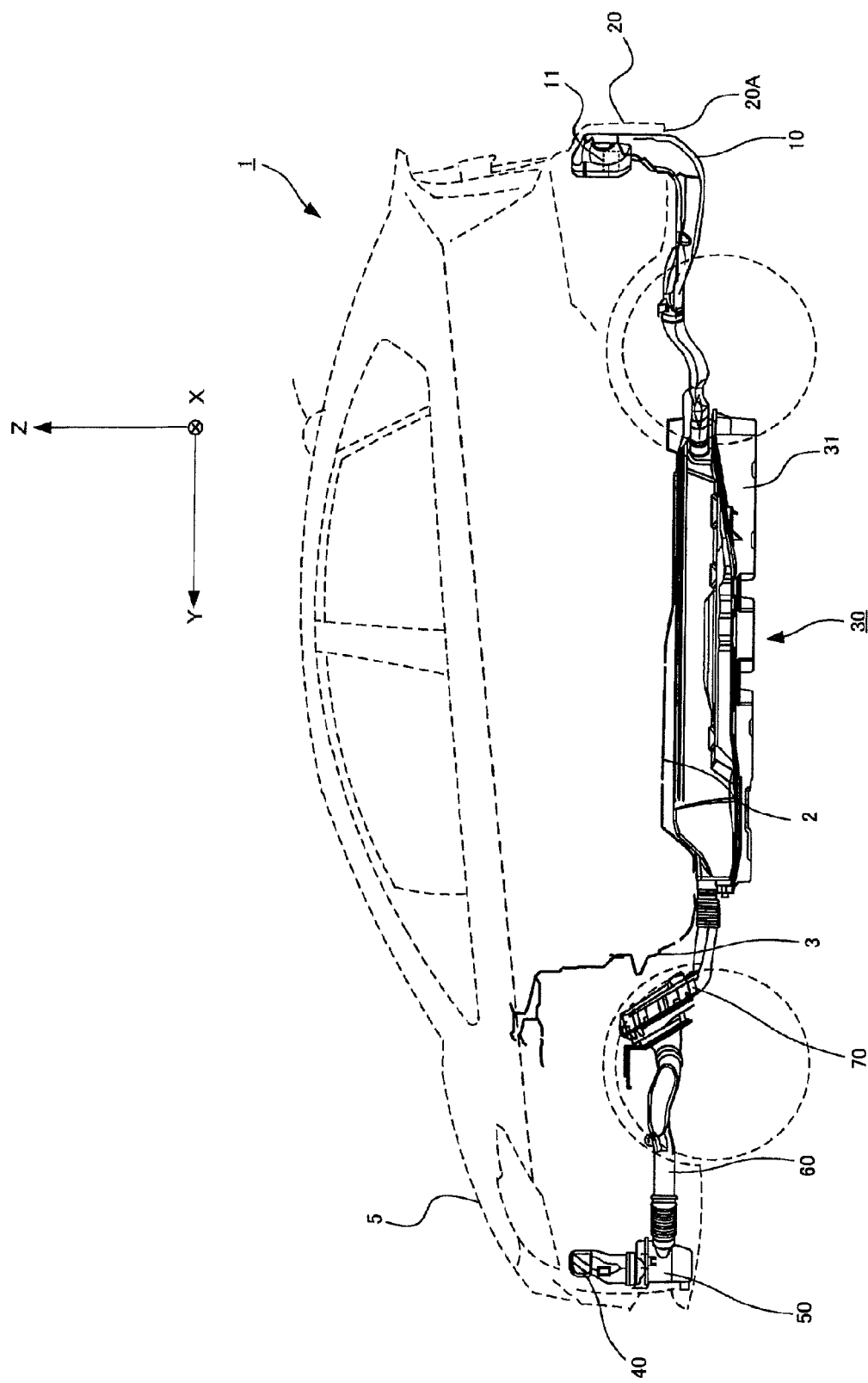
FIG. 1 is a diagram showing a battery, an intake pipe, and an exhaust pipe which are completely assembled.
Figure 2:
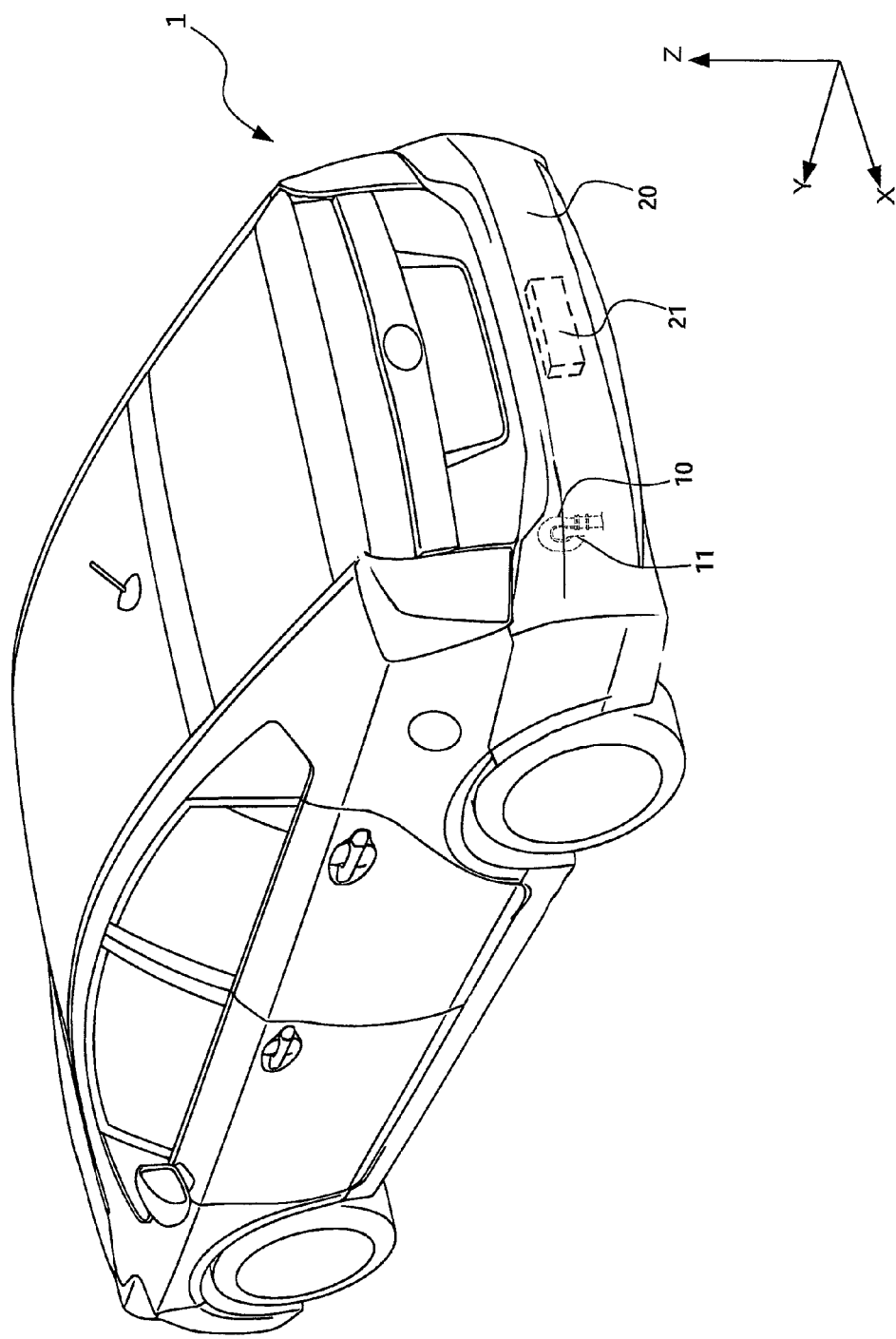
FIG. 2 is a perspective view of a vehicle seen from the back.

An embodiment of the present invention will hereinafter be described with reference to the drawings. FIG. 1 is a diagram illustrating an intake duct, a battery, and an exhaust duct which are completely assembled, and shows the outline of a vehicle by dotted lines to indicate clearly the positions of those components placed on the vehicle. FIG. 2 is a perspective view of the vehicle seen from the back and shows part of the exhaust duct by dotted lines. The vehicle 1 includes a floor panel 2 and a dash panel 3. Seats, a console box and the like, not shown, are fixed to the floor panel 2.

The vehicle 1 includes a rear bumper 20 at the back end of the vehicle. The rear bumper 20 constitutes the exterior of the vehicle. A space is formed between the rear bumper 20 and the vehicle body in a forward-rearward direction of the vehicle. As shown in FIG. 2, an air outlet port (opening portion) 11 of an exhaust duct (duct) 10 and a crash box 21 are located within the space formed between the rear bumper 20 and the vehicle body, as later described. The crash box 21 is located substantially at the center of the vehicle in a width direction thereof. When a shock is given to the vehicle, the crash box 21 may be broken to absorb the shock.

The vehicle 1 includes a battery 30. The vehicle 1 may be an electric car in which the power of the battery 30 drives a motor and the driving force of the motor rotates wheels. Alternatively, the vehicle 1 may be a hybrid car employing, as the power sources, both a first driving system in which the power of the battery 30 drives a motor and the driving force of the motor rotates wheels and a second driving system in which an internal-combustion engine provides a driving force to rotate the wheels.

The battery 30 is fixed to a lower face of the floor panel 2, that is, to an outer face of the floor panel 2 toward the outside of the vehicle. The fixing may be performed by fastening means through the use of bolts, for example. The battery 30 includes a battery case 31 and a plurality of cells, not shown. These cells are electrically connected to each other and are housed in the battery case 31. The cell may be a secondary battery such as a lithium-ion battery and a nickel metal hydride battery.

An intake duct 60 and the exhaust duct 10 are connected to the battery 30. The intake duct 60 is connected to an end of the battery case 31 closer to the front of the vehicle. The exhaust duct 10 is connected to an end of the battery case 31 closer to the back of the vehicle. A fan 70 is provided at a certain point on the intake duct 60. The fan 70 may be a sirocco fan, a cross-flow fan, or a propeller fan.

An air cleaner 50 is located on the intake duct 60 upstream of the fan 70. An air inlet port 40 is located at an upstream end of the intake duct 60. The air cleaner 50 and the air inlet port 40 are located within an engine room 5 provided in the front of the vehicle. The air outlet port 11 of the exhaust duct 10 is located within the rear bumper 20.

When the fan 70 is driven, air is taken into the intake duct 60 through the air inlet port 40. The air taken into the intake duct 60 is cleaned in the air cleaner 50 to remove foreign matters such as dust. The air cleaned in the air cleaner 50 flows into the battery case 31 to cool each of the cells housed in the battery case 31. Then, the air having a temperature increased due to the cooling of the battery 30 passes through the exhaust duct 10 and is exhausted through the air outlet port 11.

The air exhausted through the air outlet port 11 is exhausted outside the car without flowing into the interior of the car. This can prevent the air exhausted through the air outlet port 11 from increasing the temperature of the interior of the car.

Figure 3:
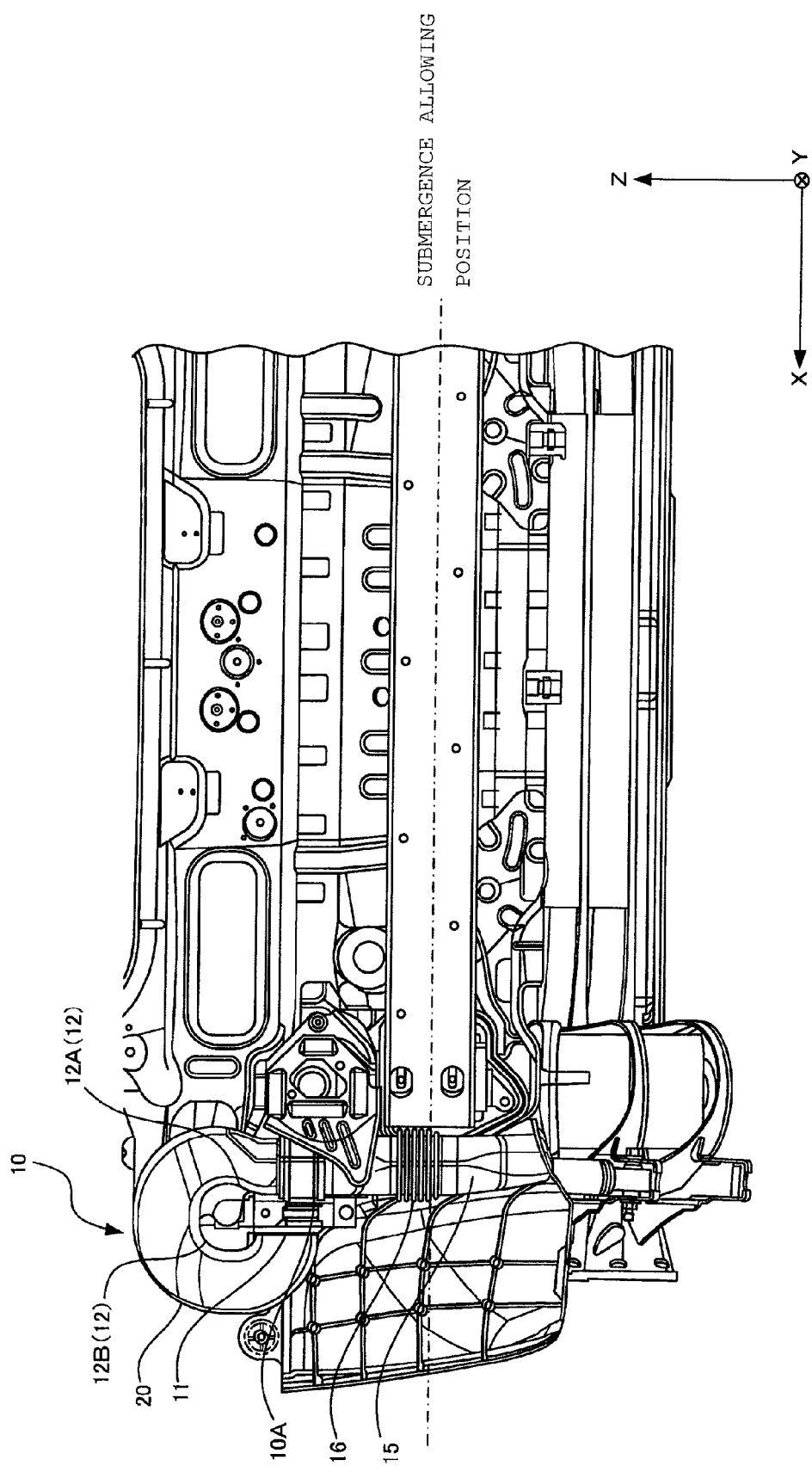
FIG. 3 is a section view partially showing a rear bumper in a width direction of the vehicle.
Figure 4:
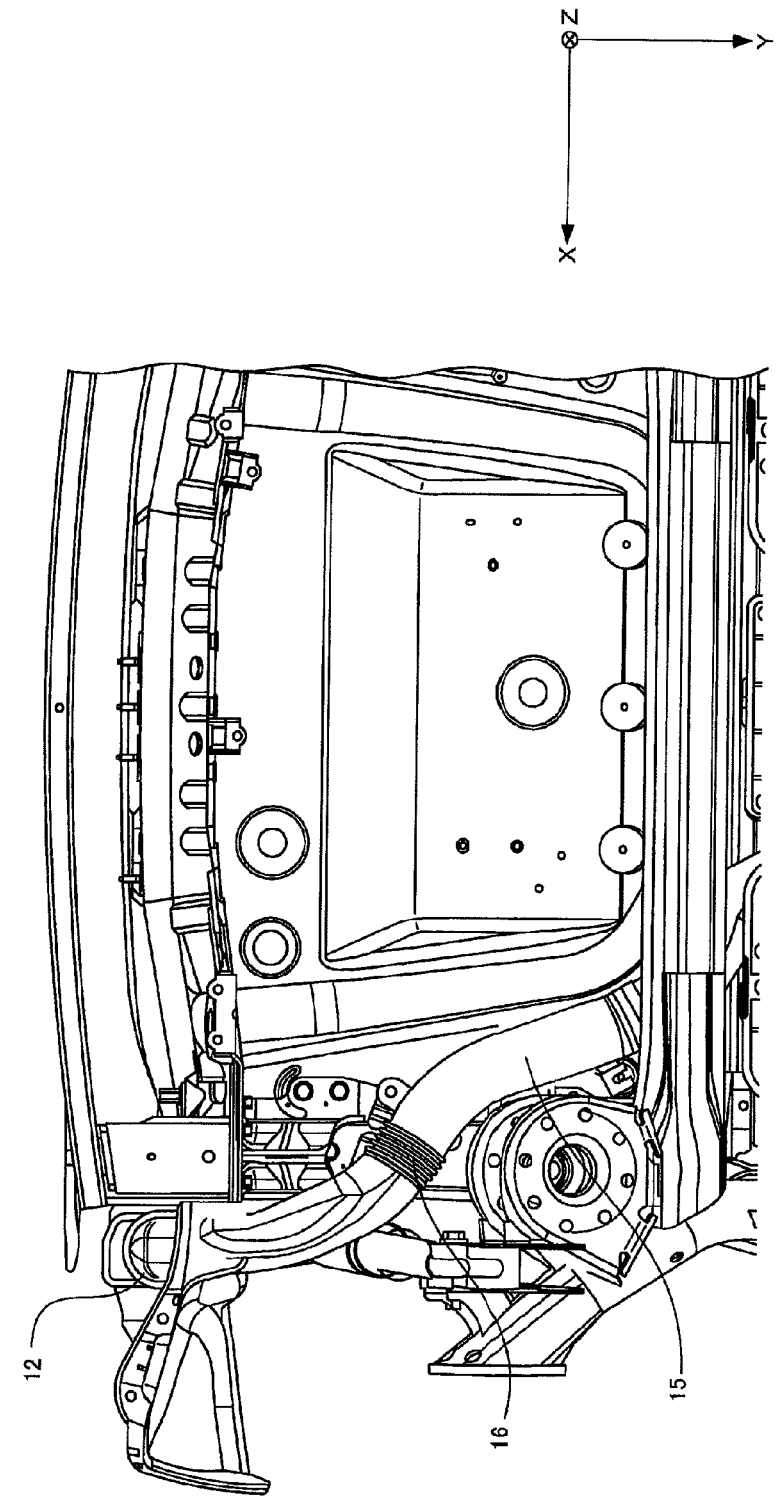
FIG. 4 is a diagram showing the rear bumper viewed from below the vehicle.

Next, the exhaust duct 10 is described in detail with reference to FIG. 1 to FIG. 4. FIG. 3 is a diagram of the exhaust duct viewed from a Y direction, and FIG. 4 is a diagram of the exhaust duct viewed from a Z direction. In the present embodiment, multiple measures are taken to prevent water within the rear bumper 20 from flowing into the battery 30 through the exhaust duct 10 as described later. Specifically, in the present embodiment, the multiple protecting measures are used on the basis of the following two points: first, the flow of the water into the air outlet port 11 of the exhaust duct 10 is precluded; second, even when the water flows through the air outlet port 11, the water is prevented from reaching the battery 30. The exhaust duct 10 extends through a bumper opening portion (guiding opening portion) 20A into the rear bumper 20. The bumper opening portion 20A is formed in a bottom face of the rear bumper 20. The bumper opening portion 20A is designed to have a diameter dimension larger than that of the exhaust duct 10. Thus, the exhaust duct 10 is located inside an inner edge of the bumper opening portion 20A, and a spacing is formed between an outer face of the exhaust duct 10 and the inner edge of the bumper opening portion 20A.

The spacing formed between the exhaust duct 10 and the bumper opening portion 20A can enhance the flexibility in inserting the exhaust duct 10 into the bumper opening portion 20A. In other words, any assembly error in inserting the exhaust duct 10 into the rear bumper 20 can be accommodated.

The internal space of the rear bumper 20 is covered with the rear bumper 20 except the bumper opening portion 20A. The placement of the air outlet port 11 of the exhaust duct 10 in the hermetically sealed space can prevent the flow of water through the air outlet port 11.

The exhaust duct 10 may be located at one end within the rear bumper 20 in the width direction (X axis direction). Referring to FIG. 4, the exhaust duct 10 includes a body-side bend portion (duct body portion) 15 bent toward the left of the vehicle as it goes from upstream to downstream in an exhaust direction. The body-side bend portion 15 includes a bend allowing portion 16. The bend allowing portion 16 may have a bellows shape. The bend allowing portion 16 can be bent to adjust the inclination of the exhaust duct 10.

The exhaust duct 10 includes an exhaust-side bend portion (duct end portion) 12. The exhaust-side bend portion 12 includes the air outlet port 11. Referring to FIG. 3, the exhaust-side bend portion 12 is connected to the body-side bend portion 15 at a connecting portion 10A. The body-side bend portion 15 and the exhaust-side bend portion 12 may be formed as an integral unit.

The air outlet port 11 may have a rectangular shape. As shown in FIG. 3 in detail, the exhaust-side bend portion 12 includes a first exhaust-side bend portion 12A (first bend portion) and a second exhaust-side bend portion 12B (second bend portion) in this order from upstream to downstream in the exhaust direction.

The first exhaust-side bend portion 12A is bent in a direction away from the air outlet port 11 in the width direction. The bending of the first exhaust-side bend portion 12A in the direction away from the air outlet port 11 can suppress a loss of pressure of the air to be exhausted. With the exhaust-side bend portion 12 in the present embodiment, the loss of pressure can be reduced as compared with the case where the exhaust-side bend portion 12 is formed, for example, in the shape of a letter U.

The second exhaust-side bend portion 12B is bent in the opposite direction to that of the first exhaust-side bend portion 12A. The second exhaust-side bend portion 12B has a portion bent along an inner face of the bumper 20. This can avoid a reduction in exhaust area of the exhaust duct 10.

The air outlet port 11 formed at a downstream end of the second exhaust-side bend portion 12B is located at a level higher than a submergence allowing position shown in FIG. 3. The submergence allowing position is a value in design indicating a position of the vehicle in a height direction to which submergence is allowed. If the water level reaches the position of the rear bumper 20 of the vehicle 1, the water may flow into the rear bumper 20 through the spacing between the bumper opening portion 20A and the exhaust duct 10. As a result, part of the inner region of the rear bumper 20 may be submerged in water. The air outlet port 11 provided at the level higher than the submergence allowing position can preclude the flow of the water into the exhaust duct 10.

The second exhaust-side bend portion 12B included in the exhaust-side bend portion 12 can prevent the water flowing in through the air outlet port 11 from reaching the battery 30. Specifically, the water flowing into the second exhaust-side bend portion 12B through the air outlet port 11 once moves upstream in the exhaust direction along an inner face of the second exhaust-side bend portion 12B but falls by gravitation before the water reaches an upper end of the second exhaust-side bend portion 12B.

The air outlet port 11 is opposed to the outer face of the exhaust duct 10 in the width direction. This causes the water moving toward the air outlet port 11 to be brought into contact with the exhaust duct 10 before the water reaches the air outlet port 11, thereby preventing the flow of the water into the air outlet port 11. The advantages provided by opposing the air outlet port 11 to the outer face of the exhaust duct 10 are described more specifically with comparative examples.

As a comparative example 1, it is contemplated that the air outlet port 11 may be faced downward to avoid the opposition to the exhaust duct 10. As described above, however, the spacing is formed between the bumper opening portion 20A and the exhaust duct 10, and foreign matters such as mud may flow into the rear bumper 20 through the spacing. The foreign matters flowing into the rear bumper 20 are removed by rinse water jetted into the rear bumper 20 through the spacing. When the air outlet port 11 is faced downward, the rinse water jetted into the rear bumper 20 may directly arrive at the air outlet port 11 to flow upstream in the exhaust duct 10.

As a second comparative example, it is contemplated that the flow of the water may be prevented by placing an obstructing plate, not shown, near the air outlet port 11. This method, however, requires the space for placing the obstructing plate, increases the cost of the obstructing plate, and may cause a pressure loss.

According to the configuration of the present embodiment, the problems encountered in the comparative examples 1 and 2 can be solved. Specifically, according to the configuration of the present embodiment, the rinse water jetted toward the air outlet port 11 can come into contact with the outer face of the exhaust duct 10 to prevent the flow of the rinse water into the exhaust duct 10. Consequently, the obstructing plate in the comparative example 2 can be omitted. The omission of the independent obstructing plate can reduce the number of parts to achieve a cost reduction.

According to the configuration of the present embodiment, even when the battery 30 is mounted outside the car, the flow of the water into the battery 30 through the exhaust duct 10 can be prevented.

(Modification 1)

While the embodiment has been described in conjunction with the exhaust duct for discharging the coolant used in cooling the battery, the present invention is not limited thereto. The present invention is applicable to an exhaust duct of any heat producing device mounted on a vehicle and requiring cooling. The heat producing device includes an inverter or a converter. The inverter converts a DC voltage output from the converter into a three-phase AC power and outputs the AC power to the motor for driving the wheels. The inverter returns a power generated by the motor to the converter in a regenerative braking operation. The converter operates as a step-up converter in running of the vehicle and operates as a step-down circuit in the regenerative braking operation.

(Modification 2)

The air flowing in the exhaust duct 10 may be warm air (heat exchange medium) supplied to increase the temperature of the battery 30 at an extremely low temperature in order to improve the output of the battery 30.

(Modification 3)

While the air outlet port 11 and the exhaust duct 10 are opposed to each other in the width direction in the above embodiment, the present invention is not limited thereto, and they may be opposed to each other in another direction such as the forward-rearward direction of the vehicle.

(Modification 4)

The present invention is applicable to the intake duct 60. Specifically, the air inlet port 40 of the intake duct 60 is located in opposite to an outer face of the intake duct 60. The air inlet port 40 is located inside a front bumper.

(Modification 5)

The shape of the exhaust-side bend portion 12 is not limited to that described in the embodiment and may be another hook shape. The hook shape is a folded shape, in other words. The folded shape can drop the water flowing in through the air outlet port 11 by gravitation to allow the discharge of the water. The hook shape may be the shape of a letter U or a letter J.

What is claimed is:
1. A vehicle on which a motor for running the vehicle is mounted, comprising:
   a battery that is mounted on the vehicle and stores an electric power for driving the motor; and
   a duct through which a heat exchange medium exchanging heat with the battery flows and that includes a first bend portion and a second bend portion, the first and second bend portions being a one piece portion and having a hook-shaped portion,
   wherein a whole area of a single opening portion of the duct faces an outer face of the duct, and the single opening portion is integrally formed with the duct at an end of the second bend portion,
   the first bend portion is located above an outer face of the duct that faces the single opening portion in a horizontal direction and protrudes in a first horizontal direction away from the single opening portion,
   the second bend portion that is connected to the single opening portion and protrudes in a second horizontal direction opposite to the first horizontal direction and away from the single opening portion, a bottom face of a boundary portion between the first and second bend portions is away from an upper end of the single opening portion in a vertical direction, wherein the duct is continuously curved from the single opening portion to the outer face of the duct that faces the single opening portion in the horizontal direction, wherein the duct includes a bellows shaped portion that is arranged at an allowing position of the vehicle to which submergence in water is allowed; and wherein the duct includes the bellows shaped portion and two straight portions that are connected to both ends of the bellows shaped portion, respectively.

2. The vehicle according to claim 1, further comprising a bumper of the vehicle, wherein the whole area of the single opening portion of the duct faces the outer face of the duct inside the bumper.

3. The vehicle according to claim 2, wherein the whole area of the single opening portion faces the outer face of the duct in a width direction of the vehicle.

4. The vehicle according to claim 2, wherein the bumper has a guiding opening portion in a bottom face that guides the duct into the bumper, and a spacing is formed between the guiding opening portion and the duct.

5. The vehicle according to claim 2, wherein the duct is an exhaust duct configured to exhaust the heat exchange medium after the heat exchange with the battery, and the bumper is located at a back end portion of the vehicle.

6. The vehicle according claim 1, wherein the single opening portion is provided at a level higher than the allowing position.

7. The vehicle according to claim 1, wherein the battery is located on a lower face of a floor panel of the vehicle.

* * * * *